W. F. BEASLEY.
TIRE CONSTRUCTION.
APPLICATION FILED FEB. 23, 1915. RENEWED SEPT. 13, 1920.
1,378,313.
Patented May 17, 1921.
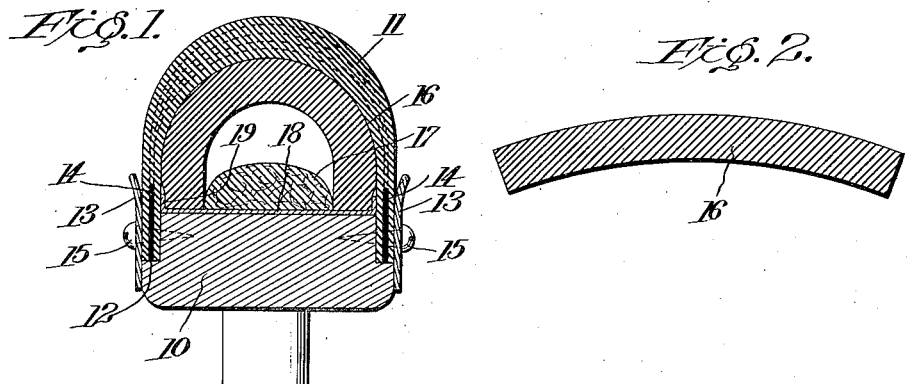
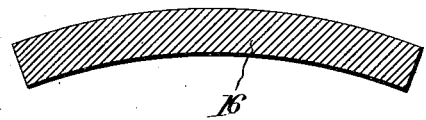
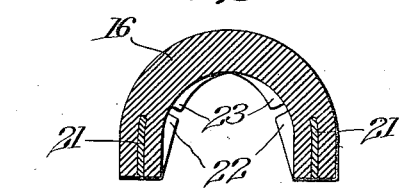
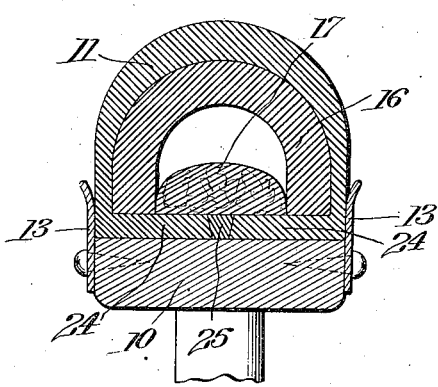
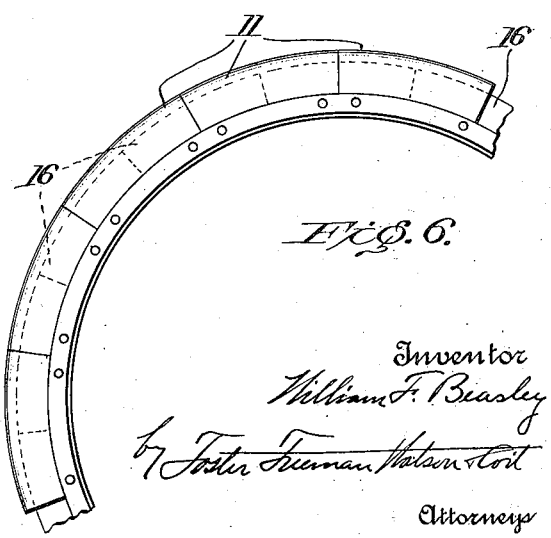

UNITED STATES PATENT OFFICE.

WILLIAM F. BEASLEY, OF PLYMOUTH, NORTH CAROLINA.

TIRE CONSTRUCTION.

1,378,313. Specification of Letters Patent. Patented May 17, 1921.

Application filed February 23, 1915, Serial No. 10,100. Renewed September 13, 1920. Serial No. 410,011.

*To all whom it may concern:*

Be it known that I, WILLIAM F. BEASLEY, a citizen of the United States, and resident of Plymouth, Washington county, North Carolina, have invented certain new and useful Improvements in Tire Construction, of which the following is a specification.

This invention relates to resilient rubber tires and does not make use of compressed air to sustain the tire in shape. The tire therefore is not such as will be put out of operative condition by a puncture or blow out. It has been my object to make a tire of the kind indicated which will have all of the necessary resiliency yielding at all points of the circumference, practically like the penumatic tire without its disadvantages. I have discovered that the proper resiliency and at the same time the necessary supporting strength can be given to the tire by making it with an outer casing surrounding a rubber arch construction which keeps the casing in shape. I have further discovered that this type of tire can be made easily and cheaply and in fact parts of old and worn tires may be used in making it. The novel features of my invention will be apparent from the following description taken in connection with the drawings.

In the drawings,

Figure 1 is a cross section of a tire embodying my invention;

Fig. 2 is a cross section of one of the arches before it is bent to shape;

Fig. 3 is a cross section of an arch of slightly modified form bent to shape;

Fig. 4 is a cross section of another form of tire embodying some of the broad features of my invention;

Fig. 5 is a cross section of still another form of tire embodying certain features of my invention;

Fig. 6 is a side view of the rim and tire showing the sectional formation.

I have discovered that instead of having an outer casing for a tire supported by air under pressure within it I can secure good results and a tire having all of the necessary resiliency by forming members of rubber in practically flat condition and bending or compressing them into arched form and placing them within the casing with the free edges of the arch resting on a support or base. This arch formation supports the outer case and at the same time lets it yield at every point as is necessary to get the best results. Referring particularly to Fig. 1, it will be seen that I make use of a base 10 which may be made of wood but which also may be made of other materials and of other forms than that shown. This base may be a separate rim which can be fastened on the rim of a wheel or it may constitute the rim of the wheel itself. Secured to the base along the edges is a casing 11 which may be made of rubber with fabric embedded in it and the side edges of this casing extend down by the sides of the base 10 and into the side notches or grooves 12. Side plates 13 may be placed on the outside of the base over the edges of the casing 11 and may extend up above the top edge of the base and any suitable fastening means, such as screws 15 may pass through the side flanges, the side edges of the casing and into the base 10. The side edges of the casing may be strengthened by material 14 embedded therein and this material may be metal, the hardened section of rubber, or other suitable strengthening material.

The casing 11 is supported from the interior by rubber arches 16 which may be made of rubber alone or rubber having therein fabric or other strengthening material. These arches are preferably molded in practically flat condition as shown in Fig. 2 and the edges are then brought toward each other under compression so as to form an arch of the shape seen in Fig. 1. It will of course be understood that the particular form assumed by the arch when it is compressed as indicated, forms no part of my invention since it may vary. I have found that when the material is molded flat and compressed into the arch it will have greater sustaining power and more resiliency than if it were molded in its arched form. The rubber arch 16 may be placed in a retainer or holder 18 having side flanges 19 before it is inserted within the casing, this holder serving to keep the arch in shape while it is being put in position. The holder may then be removed or may be allowed to remain in the tire, as shown in Fig. 1.

Within the arch 16 and on the supporting base I may place means for reinforcing and supporting the arch after it has been compressed by peripheral pressure to a predetermined extent. I arrange this reinforcing means so that it will support the arch when it has been distorted to the point where the arch formation is about to be broken down. This supporting material 17 may be made up of compressed particles of rubber vulcanized together or may be made in other suitable forms.

It will be noted that the side flange 19, the strengthening material 14 and the outside flanges 13 all tend to prevent the spreading of the inner free edges of the arch 16 under its tension of compression. In this form of the device the filling material 17 also prevents displacement of the edges of the arch in them.

In the form of arch shown in Fig. 3 there is shown within the body of the rubber at the edges a strengthening portion 21 which may be of hard rubber or other material. On the inner face of the arch, furthermore, I have shown the lower projecting portions 22 and the upper projecting portions 23 spaced from each other, but it would seem that when pressure is applied to the top of the arch tending to break it down, the projections 23 will approach and finally contact with the projections 22 and the arch will then be reinforced or supported so as to prevent breaking down.

In the modified form shown in Fig. 4 the casing 11 instead of having its lower edges extend down by the side of the base to be secured thereto, is formed with the projections 24 at the lower edges extending in toward each other. These projections or flanges rest on the base 10 and are preferably made of hard rubber or strong material. The arch 16 rests at its lower edges on the top of the flange 24. In this form I preferably make use of a soft rubber block or wedge 25 between the edges of the flanges 24, this soft rubber permitting the flanges to be forced toward each other for the purpose of getting the casing within the rim of the metal tire or holder. The supporting material 17 may be placed within the arch 16 to serve the purpose indicated in connection with Fig. 1 and the side flanges 13 also serve their purpose of preventing the spreading of the arch and in this instance also of the casing.

It will be understood that the arch may be formed as a separate piece to be placed in the separate casing as shown in connection with Figs. 1 and 4 or can be made in one piece with the casing, as shown in Fig. 5. In the modification shown in Fig. 5, the outer part 26 may be considered the casing and the inner part 27 may be considered the arch and this arch may be formed either integrally with the casing or may be cemented to the casing along the dotted line as indicated. In this figure I have also shown the base 10 projecting upwardly within the arch, thus serving to prevent the displacement of the lower edges of the arch.

The arch and the casing may of course be made each in one piece extending around the periphery of the wheel but I prefer to make it in sections, as shown in Fig. 6. In this case the arch is made in sections extending from one dotted line to the next and the casing is made in sections extending from one full line to the next so that the joint between the sections of the arch will not coincide with the joint between the sections of the casing, but the casing will overlap the joints of the arch.

Having described the invention what is claimed and desired to be secured by Letters-Patent is, In a device of the class described, the combination with the base, of a rubber arch and a casing over said arch secured in place on said base, and means within said arch for supporting it and preventing breaking down when it has been compressed a predetermined amount by peripheral pressure, said means comprising normally separated projections rigidly secured to the inner wall of the arch and adapted to engage each other when the arch is compressed.

In testimony whereof I affix my signature in presence of two witnesses.

WILLIAM F. BEASLEY.

Witnesses:
JOHN M. COIT,
ARTHUR L. BRYANT.